United States Patent
Kawashima et al.

(10) Patent No.: US 7,340,886 B2
(45) Date of Patent: Mar. 11, 2008

(54) DIESEL ENGINE COMPRISING DPM FILTER AND DPM FILTER REGENERATION METHOD

(75) Inventors: Junichi Kawashima, Yokosuka (JP);
Naoya Tsutsumoto, Yokohama (JP);
Makoto Otake, Yokohama (JP);
Terunori Kondou, Yokohama (JP);
Takao Inoue, Yokohama (JP);
Shouichirou Ueno, Yokohama (JP);
Toshimasa Koga, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 22 days.

(21) Appl. No.: 10/934,388

(22) Filed: Sep. 7, 2004

(65) Prior Publication Data

US 2005/0060989 A1   Mar. 24, 2005

(30) Foreign Application Priority Data

Sep. 18, 2003  (JP) .............................. 2003-326181

(51) Int. Cl.
*F01N 3/00* (2006.01)
*F01N 3/02* (2006.01)

(52) U.S. Cl. ............................ 60/295; 60/284; 60/287; 60/297; 60/311

(58) Field of Classification Search ............... 60/284, 60/287, 295, 297, 311
See application file for complete search history.

(56) References Cited

U.S. PATENT DOCUMENTS 5,826,425 A * 10/1998 Rossi Sebastiano et al. .. 60/274
6,497,095 B2 * 12/2002 Carberry et al. ............... 60/295
6,598,387 B2 * 7/2003 Carberry et al. ............... 60/297
6,622,480 B2 * 9/2003 Tashiro et al. ................. 60/295
6,802,180 B2 * 10/2004 Gabe et al. .................... 60/285
6,901,751 B2 * 6/2005 Bunting et al. ............... 60/297
6,931,842 B2 * 8/2005 Ohtake et al. ................. 60/295

FOREIGN PATENT DOCUMENTS

JP          5-106427 A          4/1993

* cited by examiner

*Primary Examiner*—Thomas Denion
*Assistant Examiner*—Loren Edwards
(74) *Attorney, Agent, or Firm*—Foley & Lardner LLP

(57) ABSTRACT

A diesel engine (1) comprises an exhaust passage (3), and a DPM filter (4) provided on the exhaust passage (3), which traps diesel particulate matter (DPM) contained in the exhaust gas such that the diesel particulate matter accumulates therein. An engine controller (11) starts regeneration processing of the DPM filter (4) by raising the exhaust gas temperature when a regeneration timing of the DPM filter (4) is reached, sets a target exhaust gas temperature during regeneration processing to ensure that the temperature of the DPM filter (4) does not exceed an upper temperature limit of the DPM filter (4), even when the temperature of the DPM filter (4) is raised due to the engine (1) entering an idling condition during the regeneration processing, and controls the exhaust gas temperature to the target exhaust gas temperature.

5 Claims, 10 Drawing Sheets

DIESEL ENGINE COMPRISING DPM FILTER AND DPM FILTER REGENERATION METHOD

FIELD OF THE INVENTION

This invention relates to a diesel engine, and more particularly to the processing of diesel particulate matter (DPM) contained in exhaust gas.

BACKGROUND OF THE INVENTION

JP5-106427A, published by the Japan Patent Office in 1993, discloses a technique for regenerating a so-called DPM filter in which a DPM filter for trapping DPM is disposed on an exhaust passage in order to process DPM discharged from a diesel engine, and when a predetermined amount of DPM accumulates in the DPM filter, the temperature of the DPM filter is raised such that the accumulated DPM in the DPM filter is processed by combustion.

Examples of methods for raising the temperature of a DPM filter include a method of increasing the fuel injection amount, a method of performing post-injection following the main injection, and a method of retarding the injection timing.

SUMMARY OF THE INVENTION

To perform regeneration processing, the exhaust gas temperature must be raised to the extent that the temperature of the DPM filter (bed temperature) reaches a target temperature (350° C. to 650° C.). In this case, the target exhaust gas temperature is set to a temperature at which the accumulated DPM in the filter is capable of self-ignition within a range not exceeding the upper temperature limit of the filter.

However, it was learned through experiment that when the operating condition of the diesel engine suddenly switches to an idling operation during regeneration processing, the filter temperature rises above the upper temperature limit of the filter. This will now be explained with reference to FIG. 2. FIG. 2 illustrates the course of the bed temperature of a DPM filter when the exhaust gas temperature at the filter inlet is raised to a predetermined value $b_1$ after the accumulated DPM amount reaches a predetermined value $a_1$ in order to begin regeneration processing, and the operating condition switches to an idling operation during the regeneration processing. The bed temperature of the DPM filter rises rapidly during regeneration processing when the flow rate of the exhaust gas passing through the DPM filter drops suddenly, and when the oxygen concentration of the exhaust gas passing through the DPM filter increases. During an actual operation, the bed temperature of the DPM filter rises most dramatically when the operating condition suddenly switches to an idling operation. This is due to the fact that when the flow rate of the exhaust gas passing through the DPM filter decreases, the amount of heat from the DPM filter that is carried away by the exhaust gas decreases, the oxygen concentration of the exhaust gas increases, and the accumulated DPM in the DPM filter burns more vigorously.

In FIG. 2, the bed temperature of the DPM filter rises greatly toward the downstream side of the DPM filter following a switch to an idling operation, whereby the maximum temperature of the DPM filter reaches a predetermined value $c_1$. In other words, assuming that the critical temperature of the DPM filter is d in the diagram, the exhaust gas temperature at the filter inlet during a regeneration operation is considerably lower than d, which is the critical filter temperature, but when the operating condition suddenly switches to an idling operation during the regeneration processing, the maximum filter temperature $c_1$ exceeds the critical filter temperature d. When the maximum filter temperature rises above the critical filter temperature in this manner, the durability of the filter deteriorates.

It is therefore an object of this invention to suppress deterioration of the durability of a DPM filter, even when the operating condition switches suddenly to an idling operation during regeneration processing, by ensuring that a maximum filter temperature at this time does not exceed an upper filter temperature limit.

In order to achieve above-mentioned object, this invention provides an engine system comprising: a diesel engine; an exhaust passage connected to the engine; a DPM filter provided on the exhaust passage, which traps diesel particulate matter (DPM) contained in an exhaust gas such that the diesel particulate matter accumulates therein; a temperature adjusting device coupled to the engine, the temperature adjusting device adjusting an exhaust gas temperature of the engine and a controller coupled to the temperature adjusting device. The controller starts regeneration processing of the DPM filter by controlling the temperature adjusting device to raise an exhaust gas temperature when a regeneration timing of the DPM filter is reached; sets a target exhaust gas temperature during regeneration processing to ensure that a temperature of the DPM filter does not exceed an upper temperature limit of the DPM filter, even when the temperature of the DPM filter is raised due to the engine entering an idling condition during the regeneration processing; and control the temperature adjusting device to control the exhaust gas temperature to the target exhaust gas temperature.

The details as well as other features and advantages of this invention are set forth in the remainder of the specification and are shown in the accompanying drawings.

DESCRIPTION OF THE PREFERRED EMBODIMENTS

Figure 1:
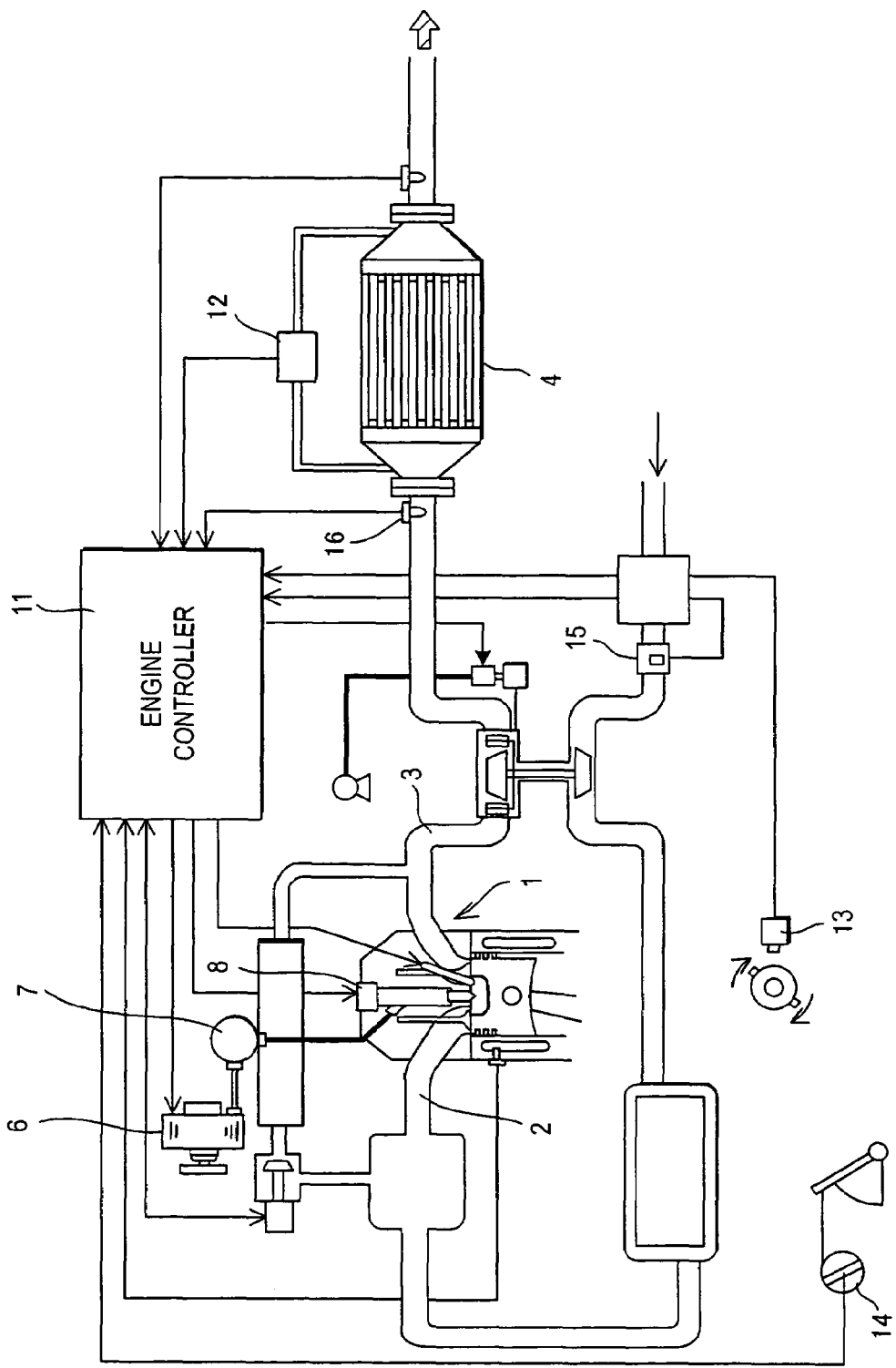
FIG. 1 is a schematic diagram of a diesel engine system with a DPM filter according to this invention.

Referring to FIG. 1 of the drawings, an engine 1 is a diesel engine to which an intake passage 2 and an exhaust passage 3 are connected. A DPM filter 4 which traps diesel particulate matter (DPM) contained in the exhaust gas is provided on the exhaust passage 3. When the amount of DPM trapped in the DPM filter 4 (the accumulated DPM amount) reaches a predetermined value, the exhaust gas temperature is raised to remove the DPM through combustion.

A differential pressure sensor 12 is provided on a differential pressure detection passage, which bypasses the DPM filter 4, to detect pressure loss in the DPM filter 4 (pressure difference between the upstream side and downstream side of the DPM filter 4).

The pressure loss in the DPM filter 4, detected by the differential pressure sensor 12, is transmitted to an engine controller 11 together with a rotation speed from an engine rotation speed sensor 13, an accelerator operation amount (accelerator pedal depression amount) from an accelerator operation amount sensor 14, and an intake air flow from an air flow meter 15. Fuel injection control and regeneration processing of the DPM filter 4 are performed on the basis of this information by the engine controller 11, which is constituted by one or more microprocessors, memory, an input/output interface, and so on.

To prevent the smoke that is produced in large amounts in the vicinity of full load during fuel injection control, a maximum injection amount Qfmax is determined according to a cylinder intake air amount Qac, which is calculated from the output of the air flow meter 15, and an engine rotation speed Ne. The basic fuel injection amount corresponding to the accelerator operation amount is limited by the maximum injection amount Qfmax, and a fuel injection amount Qf following limitation is injected at an optimum timing using a fuel injection device. In this embodiment, the fuel injection device is a common rail injection device constituted by a supply pump 6, a common rail 7, and an injector 8.

The cylinder intake air amount Qac indicates an amount of intake air per cylinder which is calculated in consideration of the fact that dead time and response delays occur from the air flow meter position to aspiration into the cylinder.

Regeneration processing of the DPM filter 4 is performed as follows. Before regeneration processing begins, a pressure loss ΔP detected by the differential pressure sensor 12 and a regeneration start determining value are compared to determine whether or not a regeneration start timing has been reached. When the regeneration start timing is reached, the exhaust gas temperature is raised to begin regeneration processing of the DPM filter 4. Meanwhile, a pressure loss ΔP detected by the differential pressure sensor 12 during the regeneration processing is compared to a regeneration end determining value to determine whether or not a regeneration end timing has been reached. When the regeneration end timing is reached, regeneration processing ends.

Here, regeneration processing of the DPM filter 4 is performed by increasing a main injection amount that is injected from the fuel injection device in order to raise the exhaust gas temperature, but as noted below, the exhaust gas temperature may also be raised by retarding the fuel injection timing, injecting fuel once more (post-injection) following main injection, and so on.

In an engine which performs the regeneration processing of the DPM filter 4 according to this invention, a target temperature during regeneration processing is set by predicting the extent to which the temperature of the DPM filter will rise when the operating condition of the engine switches to an idling operation during the regeneration processing. More specifically, the accumulated DPM amount in the DPM filter 4 is estimated, and a maximum filter temperature when the operating condition switches to an idling operation during regeneration processing is forecast. A target exhaust gas temperature during regeneration processing is then set in accordance with the accumulated DPM amount at the start of regeneration processing such that the forecast maximum filter temperature does not exceed an upper filter temperature limit, whereupon the exhaust gas temperature is controlled to the set target exhaust gas temperature.

Figure 2:
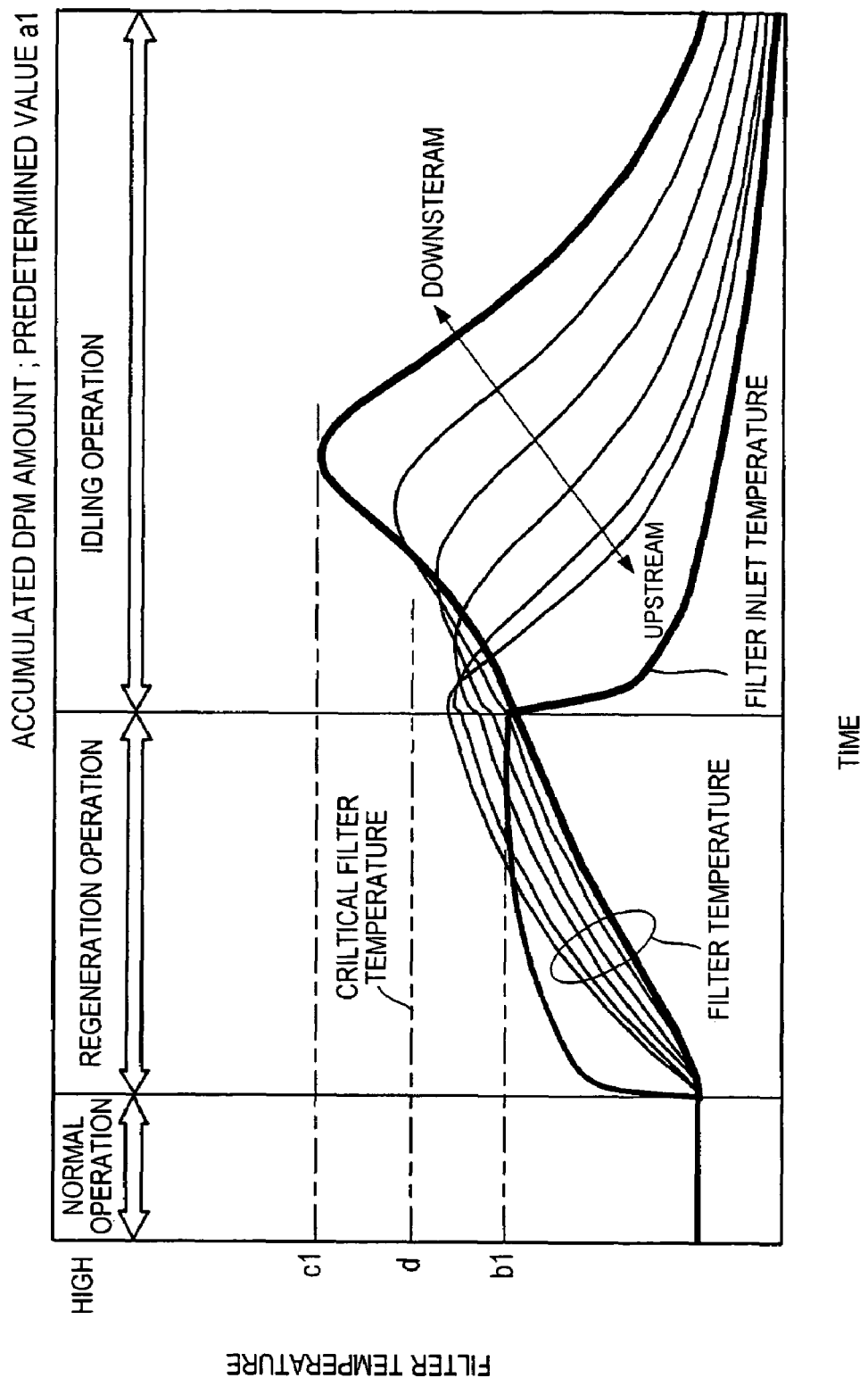
FIG. 2 is a diagram showing variation in the temperature of the DPM filter when the operating condition switches suddenly to an idling condition during regeneration processing.

Regeneration processing will now be described further. FIG. 2 illustrates the course of a bed temperature of the DPM filter 4 (hereinafter referred to as the filter temperature) when the exhaust gas temperature at the inlet to the DPM filter 4 (hereinafter referred to as the filter inlet temperature) is raised to a predetermined value b1 after the accumulated DPM amount reaches a predetermined value a1 in order to begin regeneration processing, and the operating condition switches suddenly to an idling condition during the regeneration processing.

Dramatic increases in the temperature of the DPM filter 4 during regeneration processing occur when
(1) the flow rate of the exhaust gas passing through the DPM filter 4 suddenly decreases, and
(2) the oxygen concentration of the exhaust gas passing through the DPM filter 4 increases, the filter temperature increasing by the greatest extent during an actual operation when the operating condition switches suddenly to an idling operation. This is due to the fact that
(3) when the flow rate of the exhaust gas passing through the DPM filter 4 decreases, the amount of heat that is carried away by the exhaust gas decreases, and
(4) when the oxygen concentration of the exhaust gas increases, combustion of the accumulated DPM in the DPM filter 4 becomes more vigorous.

In FIG. 2, the temperature of the DPM filter 4 increases greatly toward the downstream side of the DPM filter 4 following a switch to an idling operation, whereby the maximum temperature of the DPM filter 4 reaches a predetermined value c1. In other words, from the combination (of the accumulated DPM amount at the start of filter regeneration processing, the filter inlet temperature during regeneration processing, and the maximum filter temperature when the operating condition switches suddenly to an idling operation during regeneration processing) in FIG. 2, one set of data (a1, b1, c1) is obtained.

To obtain other data for this combination, an experiment was conducted to determine how the maximum filter temperature changes when the operating condition suddenly switches to an idling operation during regeneration processing by varying the filter inlet temperature during regeneration processing and the accumulated DPM amount at the start of filter regeneration processing respectively. The results of the experiment are summarized in FIG. 3. For ease of comprehension, the accumulated DPM amounts at the start of filter regeneration processing are represented by four values, A, B, C, D, in succession from the highest value.

Figure 3:
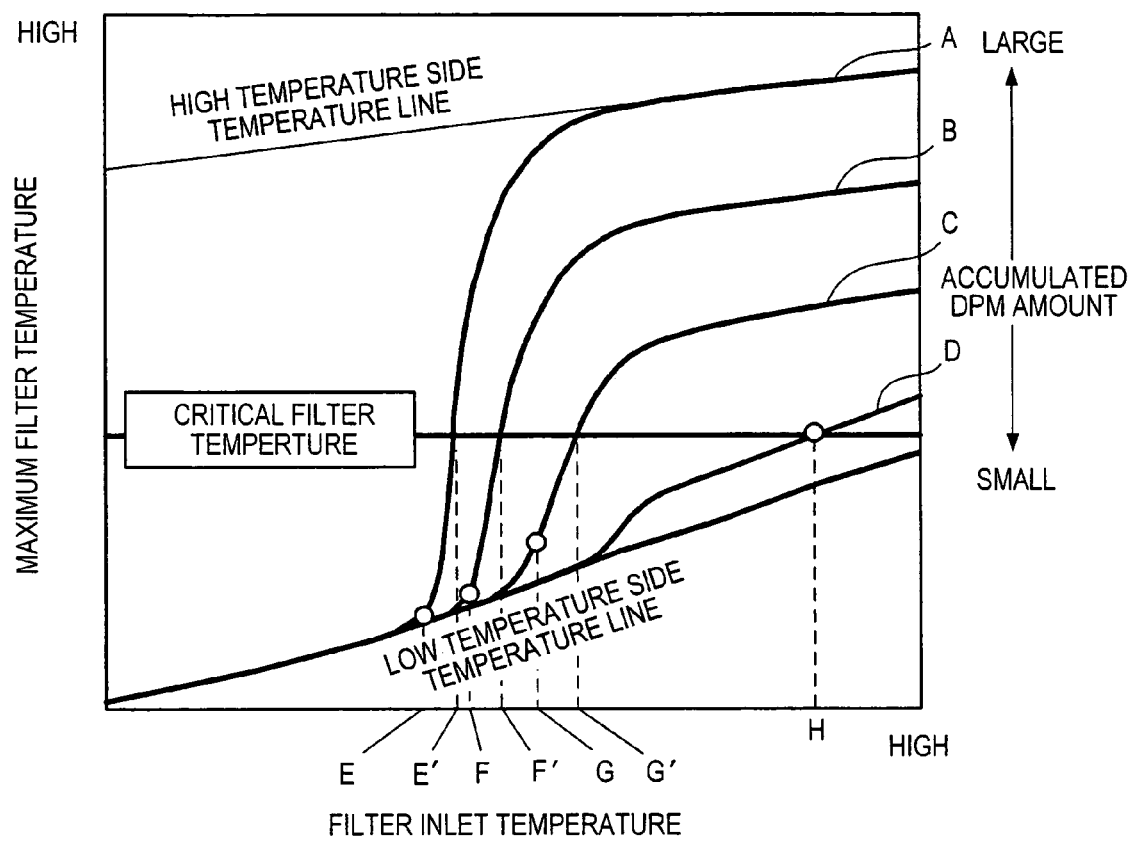
FIG. 3 is a characteristic diagram of a maximum filter temperature when a filter inlet temperature during regeneration processing and an accumulated DPM amount at the start of filter regeneration processing vary.

From FIG. 3, the inventor learned the following. When the accumulated DPM amount is at its greatest value, A, the maximum filter temperature rises gently along a low temperature side temperature line as the filter inlet temperature is raised, but departs from the low temperature side temperature line and begins to rise rapidly when the filter inlet temperature reaches a certain temperature. When the filter inlet temperature is raised further, the maximum filter temperature converges gently with a high temperature side temperature line. As the accumulated DPM amount gradually decreases to the values B, C, and D, the temperature at which the maximum filter temperature departs from the low temperature side temperature line increases, and the incline following departure from the low temperature side temperature line becomes more gentle.

Here, the upper high temperature side temperature line is determined by the accumulated DPM amount remaining in the DPM filter 4 at the point where the operating condition switches to an idling operation, and the lower low temperature side temperature line is determined by the temperature at which the accumulated DPM in the DPM filter 4 is extinguished.

If the critical filter temperature, which is the critical value at which the durability of the filter 4 begins to deteriorate, is inserted into FIG. 3, it can be seen that the maximum filter temperature exceeds the critical filter temperature at all of the accumulated DPM amounts A, B, C, D. Hence, in order to keep the maximum filter temperature below the critical filter temperature even when the operating condition suddenly switches to an idling condition during regeneration processing, an upper temperature limit must be imposed on the filter inlet temperature, and the filter inlet temperature must be limited to this upper temperature limit. When the accumulated DPM amount corresponds to D, for example, the maximum filter temperature can be kept below the critical filter temperature, even when the operating condition suddenly switches to an idling condition during regeneration processing, by limiting the filter inlet temperature to a temperature H which serves as an upper temperature limit.

Likewise when the accumulated DPM amount corresponds to A, B, and C, the filter inlet temperature should be limited respectively to temperatures E', F', G' serving as upper temperature limits. In these cases, however, the temperatures E', F', G' each exist on steep parts of their respective characteristic gradients, and it is therefore difficult to use these temperatures in actual control. Hence, as shown in the drawing, a temperature E directly before the A characteristic departs from the low temperature side temperature line, a temperature F directly after the B characteristic departs from the low temperature side temperature line, and a temperature G slightly after the C characteristic begins to rise are employed as upper temperature limits when the accumulated DPM amount corresponds to A, B, and C respectively.

In so doing, an upper temperature limit (to be referred to hereinafter as an upper regeneration temperature limit) at the filter inlet is determined for each of the four accumulated DPM amounts A, B, C, D to ensure that the maximum filter temperature does not exceed the critical filter temperature.

Figure 4:
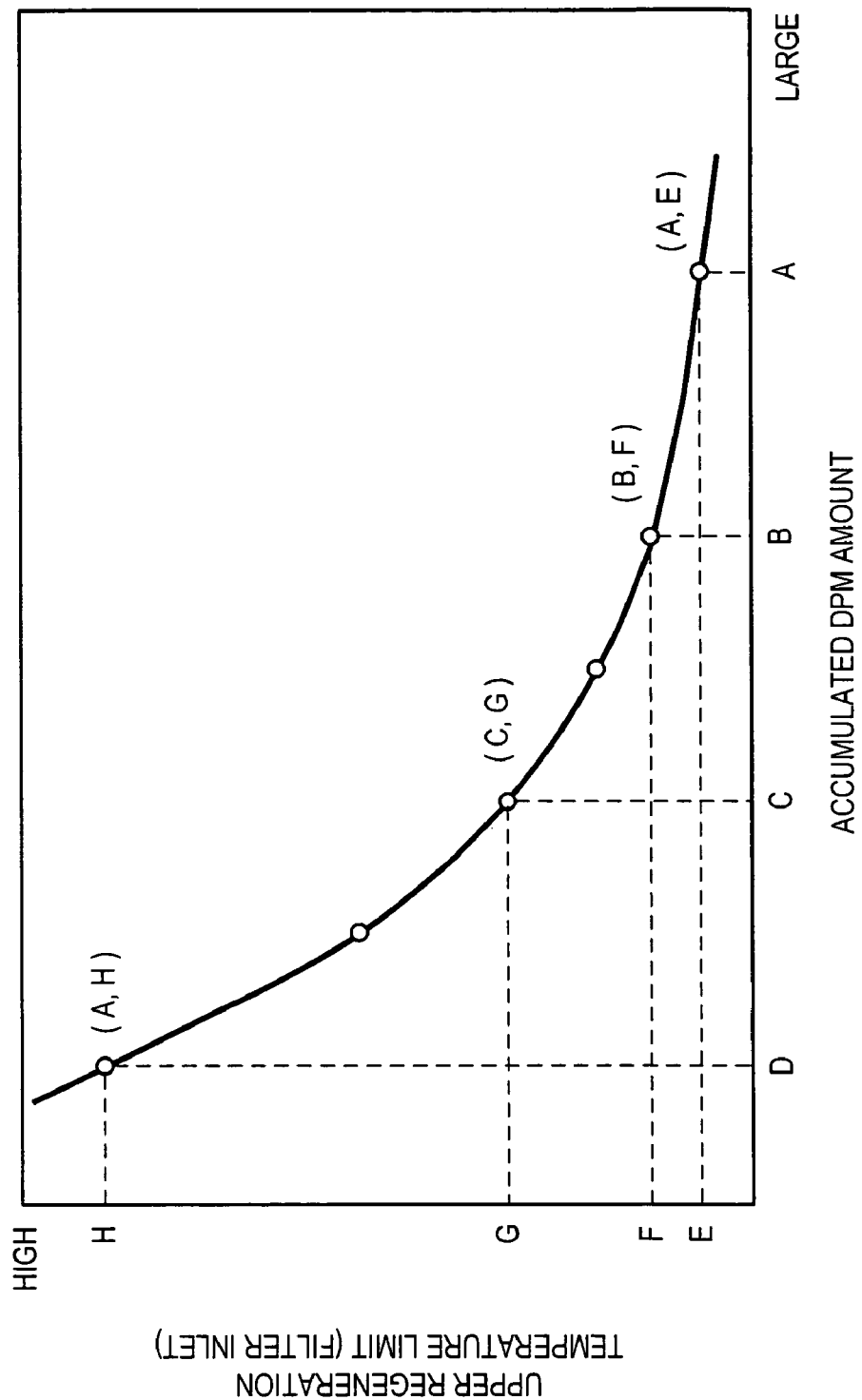
FIG. 4 is a characteristic diagram of an upper regeneration temperature limit in relation to the accumulated DPM amount.

Hence when the accumulated DPM amount at the start of filter regeneration processing is repositioned on the abscissa and the upper regeneration temperature limit is repositioned on the ordinate, the characteristic of FIG. 4 is obtained. According to this characteristic, the upper regeneration temperature limit decreases as the accumulated DPM amount at the start of filter regeneration processing increases. By setting the upper regeneration temperature limit in accordance with the accumulated DPM amount at the start of filter regeneration processing and controlling the actual filter inlet temperature below the set upper regeneration temperature limit, the maximum filter temperature can be held below the critical regeneration temperature when the operating condition switches suddenly to an idling condition, or indeed to any other operating condition, during regeneration processing.

It should be noted that in FIG. 4, the four points (A, E), (B, F), (C, G), (D, H) are connected smoothly to illustrate that the upper regeneration temperature limit in relation to the accumulated DPM amount is a continuous value.

The control described above, which is performed by the engine controller 11, will now be described further with reference to flowcharts.

Figure 5:
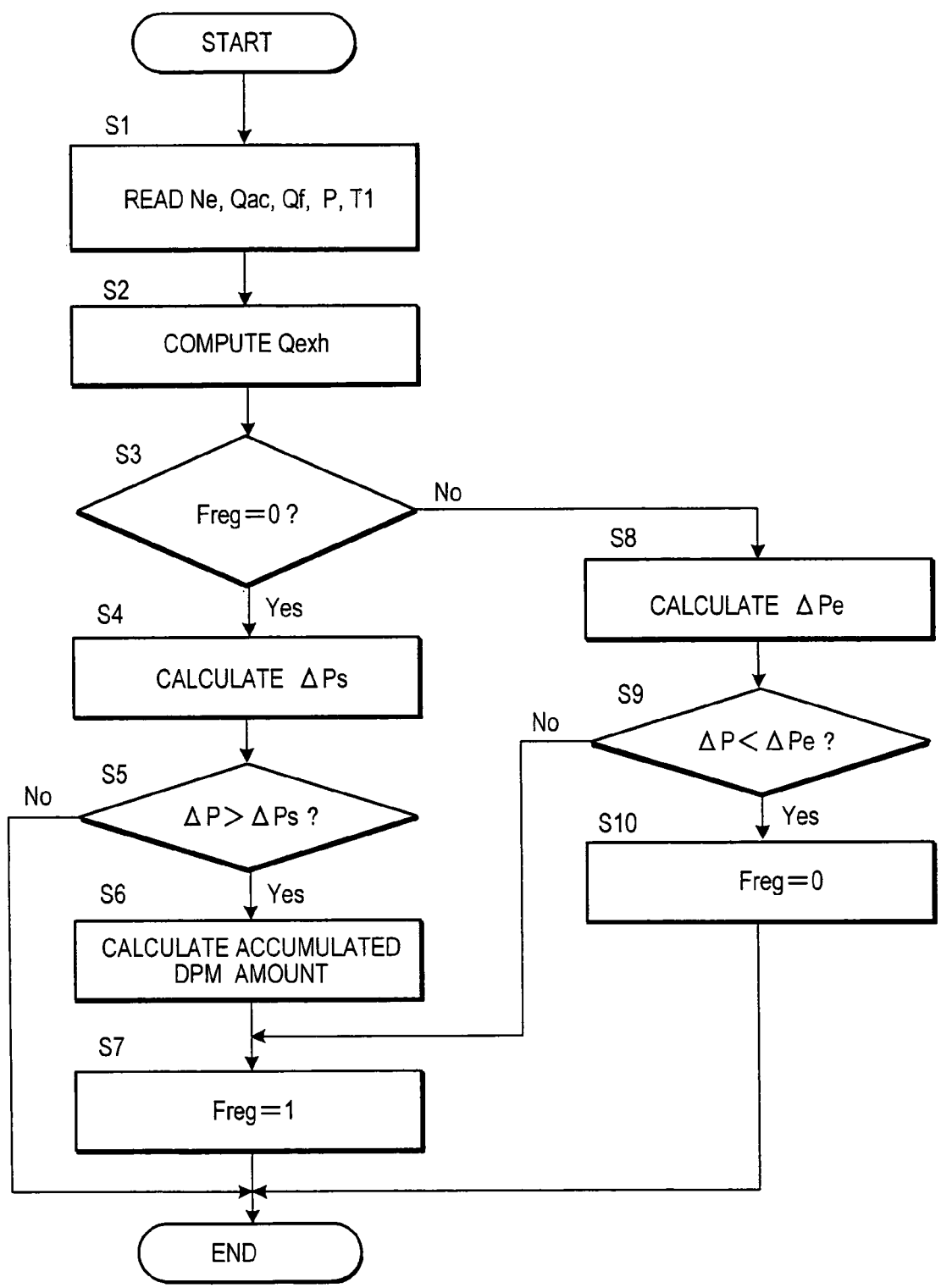
FIG. 5 is a flowchart for setting a regeneration processing flag.

FIG. 5 is a flowchart for setting a regeneration processing flag. The engine controller 11 executes this flowchart repeatedly at predetermined time intervals (of ten milliseconds, for example).

In a step S1, the cylinder intake air amount Qac [mg/st], the engine rotation speed Ne [rpm], the fuel injection amount Qf [mm$^3$/st], the pressure loss $\Delta P$ in the DPM filter 4, detected by the differential pressure sensor 12, and a filter inlet temperature T1 detected by a temperature sensor 16 are read. The unit "/st" means "per fuel injection". The cylinder intake air amount Qac is a value calculated from the output of the air flow meter 15. The fuel injection amount Qf is basically determined from the accelerator operation amount and engine rotation speed.

In a step S2, the exhaust gas flow is calculated on the basis of the engine rotation speed Ne, the cylinder intake air amount Qac, and the fuel injection amount Qf. It is considered that the exhaust gas flow is basically the sum of the airflow and the fuel flow. However, the units of Qac and Qf differ, and hence for the purpose of calculation, the units must be aligned. For example, the cylinder intake air amount Qac is converted into a cylinder intake air amount Qac1 in units of [g/min] by means of the following equation $$Qac[g/min]=(Qac[mg/st]\times Ne[rpm]/2)\times(nc/1000) \qquad (1)$$

where nc is the number of cylinders.

The fuel injection amount Qf is converted into a fuel injection amount Qf5 in units of [L/hour] by means of the following equation $$Qf5[L/hour]=Qf[mm^3/st]\times Ne[rpm]\times K1 \qquad (2)$$

where K1 is a unit conversion coefficient.

The cylinder intake air amount Qac1 and fuel injection amount Qf5 are then used to calculate an exhaust gas flow Vex1 according to the following equation $$Vex1[L/hour]=(Qac1[g/min]\times 60/\rho 2)+Qf5[L/hour] \qquad (3)$$

where $\rho 2$ is the air density [g/L].

The exhaust gas flow is not limited to the unit [L/hour] used in Equation (3), and may be determined as Vex2 [g/hour], Vex3 [L/sec], or Vex4 [m$^3$/min]. In the case of the latter exhaust gas flow Vex4 [m$^3$/min], a further conversion to an exhaust gas flow Qexh [m$^3$/min] in a normal state (20° C., 1 atm) may be performed using $\Delta P$ and T1[° C.]. The exhaust gas flow Qexh is employed here.

In a step S3, a regeneration processing flag Freg is checked. The flag Freg switches to "1" when a regeneration start condition is established, and is set initially to "0" at the time of engine start-up. When the regeneration start condition is not established (Freg=0), the routine advances to a step S4, where a regeneration start determining value $\Delta Ps$, which is the pressure loss at the start of regeneration, is calculated from the exhaust gas flow Qexh [m$^3$/min] by referring to a table shown in FIG. 6.

Figure 6:
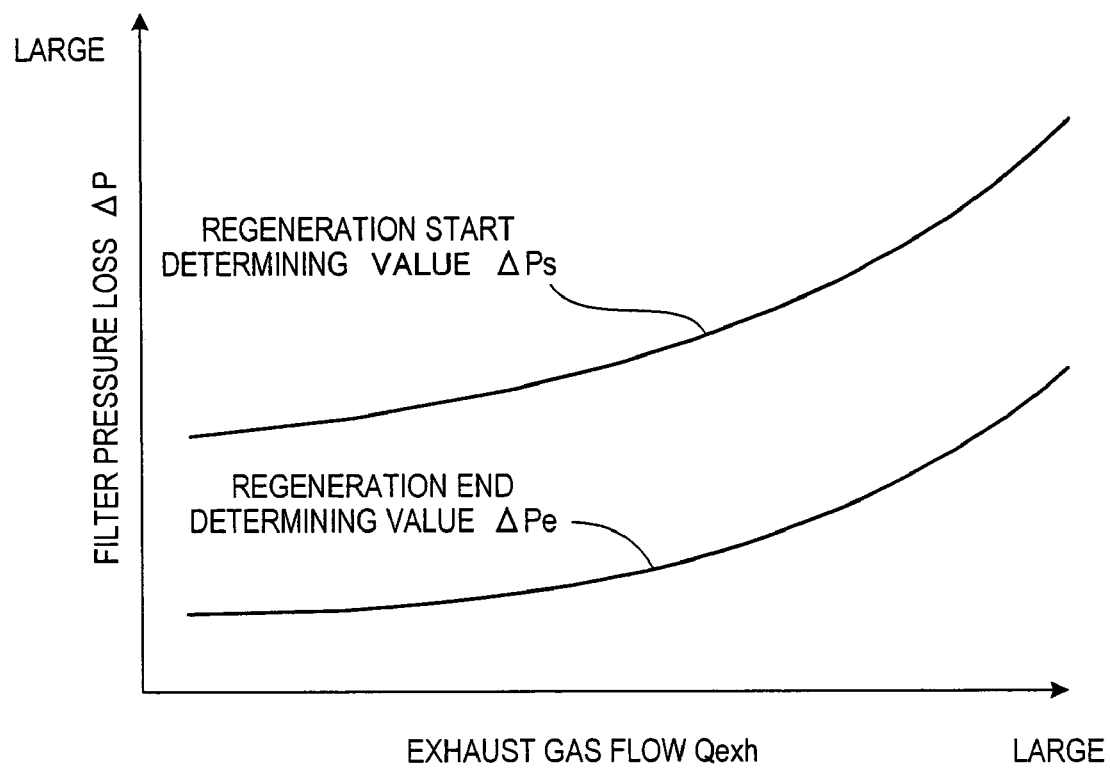
FIG. 6 is a characteristic diagram of a regeneration start determining value and a regeneration end determining value in relation to an exhaust gas flow.

FIG. 6 also illustrates a regeneration end determining value $\Delta Pe$. The pressure loss in the DPM filter 4 at the start of regeneration is great, and decreases at the end of regeneration following combustion of the DPM. Both the regeneration start determining value ΔPs and the regeneration end determining value ΔPe increase as the exhaust gas flow Qexh increases. The reason for setting the regeneration start determining value ΔPs and regeneration end determining value ΔPe as values corresponding to the exhaust gas flow Qexh is that although pressure loss in the DPM filter 4 increases as the accumulated DPM amount in the DPM filter 4 increases, the pressure loss also varies in accordance with the exhaust gas flow, and hence at the same trapped DPM amount, the pressure loss increases as the exhaust gas flow increases.

In a step S5, the pressure loss ΔP in the DPM filter 4 is compared to the regeneration start determining value ΔPs. If ΔP is smaller than ΔPs (before regeneration processing), the current processing ends.

Figure 7:
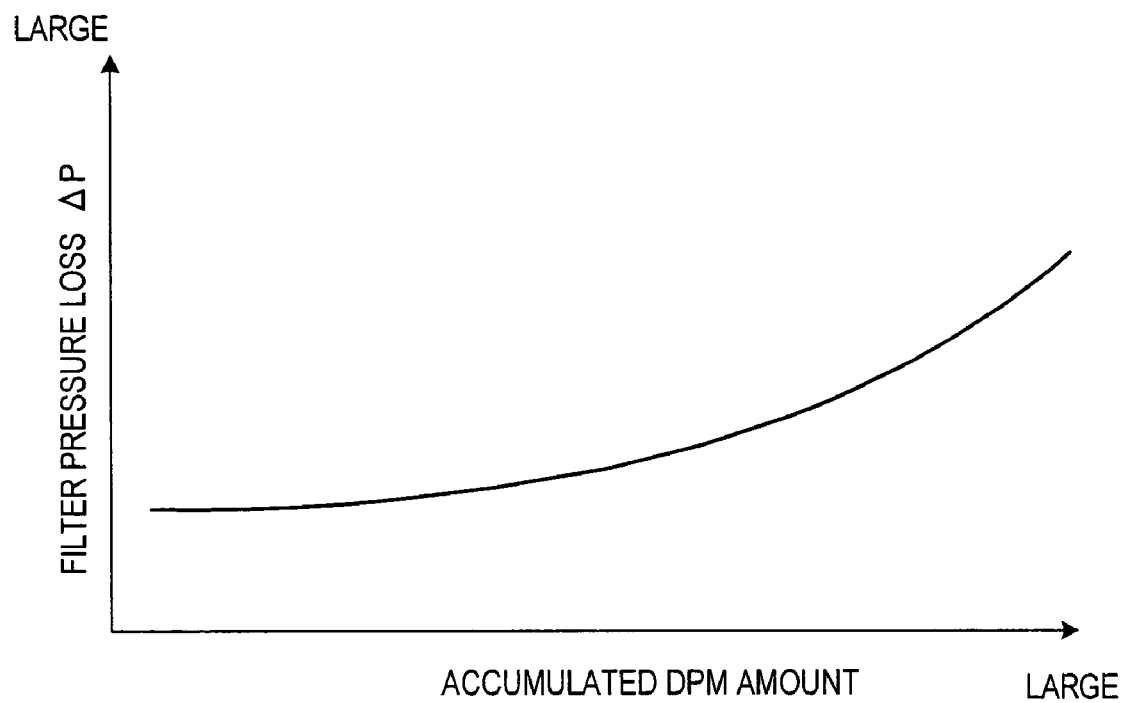
FIG. 7 is a characteristic diagram of the accumulated DPM amount in relation to filter pressure loss.

When ΔP becomes greater than ΔPs, it is determined that the regeneration start condition has been established, and the routine advances to a step S6. In the step S6, the accumulated DPM amount at the start of filter regeneration processing is calculated from the pressure loss ΔP in the DPM filter 4 by referring to a table shown in FIG. 7. As shown in FIG. 7, the accumulated DPM amount at the start of filter regeneration processing is a value which increases as the pressure loss ΔP in the DPM filter 4 increases.

In the step S7, the regeneration processing flag Freg is set to "1". When the regeneration processing flag Freg is set to "1", regeneration processing is executed according to the flowchart in FIG. 9, to be described below. During regeneration processing, the exhaust gas temperature is raised by increasing the main injection amount, and thus the accumulated DPM in the filter 4 is burned.

Regeneration processing is not limited to this method, and may be achieved by means of a relative retardation of the injection timing at which fuel is injected from the fuel injection device, or by injecting fuel once more (post-injection) following injection at the main injection timing.

If the regeneration processing flag Freg is at "1" in the step S3 (if regeneration processing is underway), the routine advances to a step S8, where the regeneration end determining value ΔPe, which is the pressure loss at the end of regeneration, is calculated from the exhaust gas flow Qexh [m³/min] by referring to the table shown in FIG. 6.

In a step S9, the pressure loss ΔP in the DPM filter 4 is compared to the regeneration end determining value ΔPe. If ΔP is greater than ΔPe, the operation of the step S7 is executed to continue regeneration processing.

If ΔP is smaller than ΔPe, it is determined that a regeneration end timing has been reached. The routine then advances to a step S10, where the current regeneration processing is ended and the regeneration processing flag Freg is set to "0" in preparation for the next regeneration processing.

Figure 8:
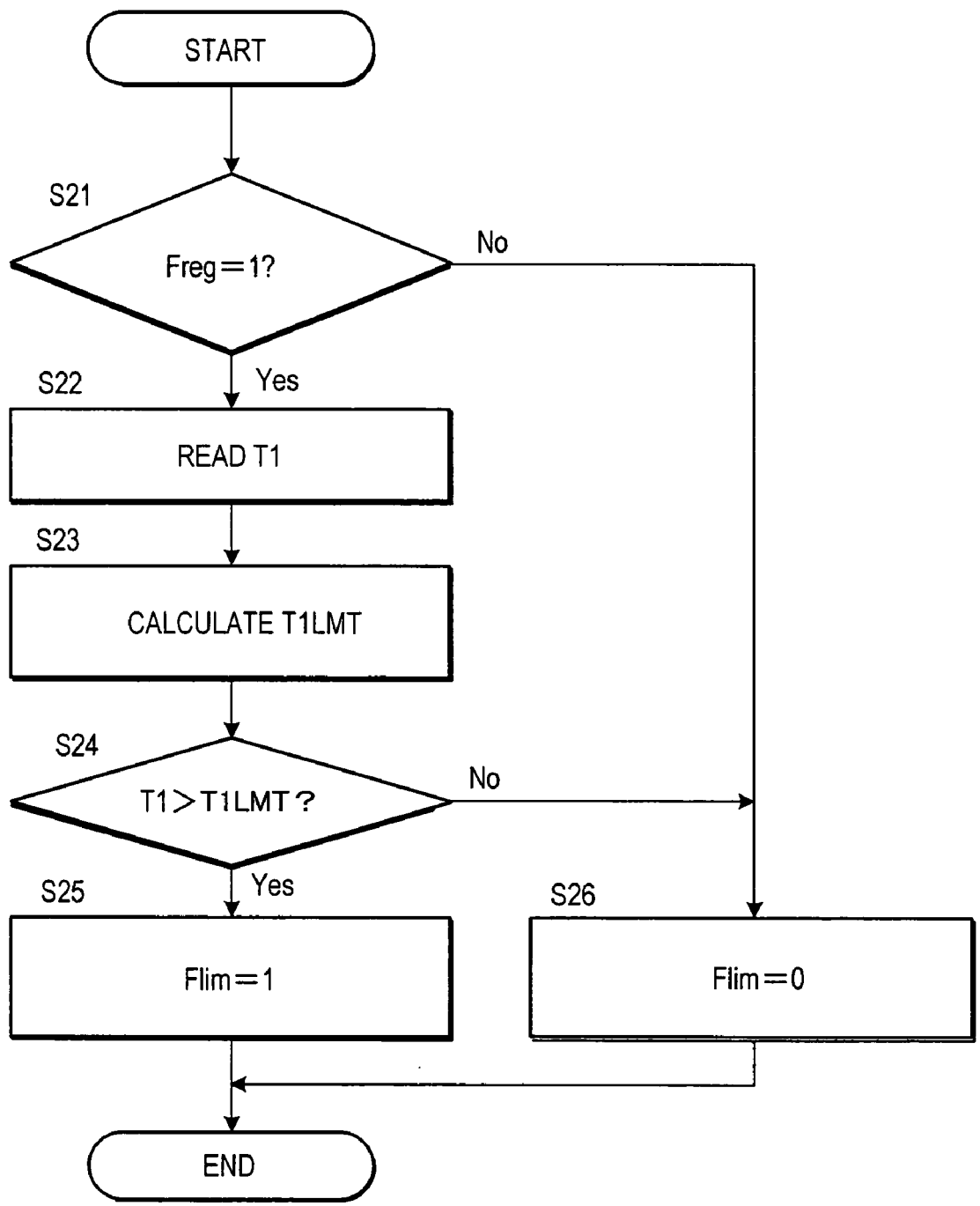
FIG. 8 is a flowchart for setting an exhaust gas temperature limiting flag.

FIG. 8 is a flowchart for setting an exhaust gas temperature limiting flag. The engine controller 11 executes this flowchart following the flowchart in FIG. 5 at predetermined time intervals (of ten milliseconds, for example).

In a step S21, the regeneration processing flag Freg set in FIG. 5 is checked. When the flag Freg is at "1", it is determined that regeneration processing is underway, and the routine advances to a step S22.

In the step S22, the filter inlet temperature T1 detected by the temperature sensor 16 is read.

In a step S23, an upper regeneration temperature limit T1LMT is calculated from the accumulated DPM amount, calculated in the step S6 of FIG. 5, by referring to the table shown in FIG. 4. As shown in FIG. 4, the upper regeneration temperature limit T1LMT is a value which increases as the accumulated DPM amount increases.

In a step S24, the filter inlet temperature T1 is compared to the upper regeneration temperature limit T1LMT. If T1 exceeds T1LMT, the routine advances to a step S25, where an exhaust gas temperature limiting flag Flim is set to "1". When the flag Flim is at "1", this indicates that exhaust gas temperature control to reduce the filter inlet temperature below the upper regeneration temperature limit is to be performed. When T1 does not exceed T1LMT or the flag Freg is at "0", exhaust gas temperature control need not be performed, and hence the routine advances to a step S26, where the flag Flim is set to "0".

Figure 9:
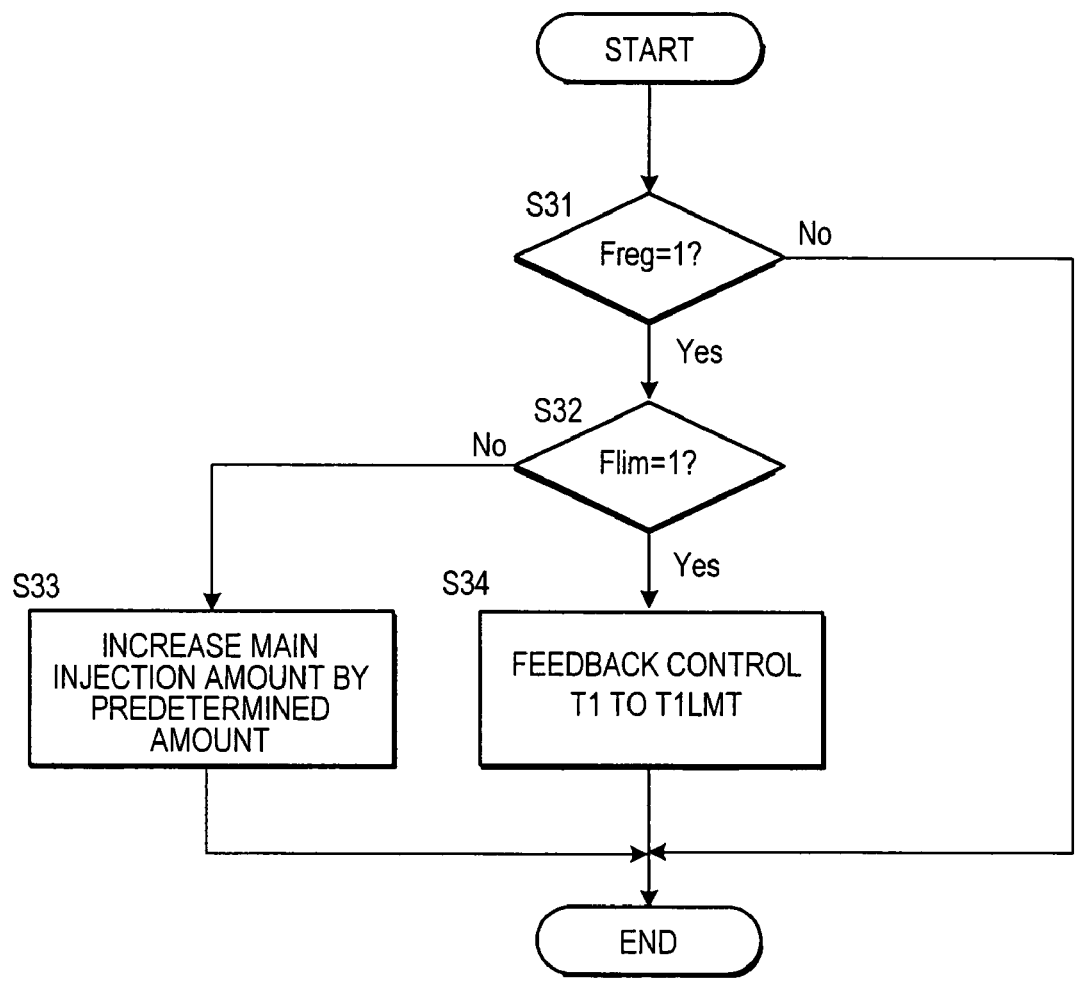
FIG. 9 is a flowchart of regeneration processing.

FIG. 9 is a flowchart of regeneration processing. The engine controller 11 executes this flowchart at predetermined time intervals (of ten milliseconds, for example).

In a step S31, the regeneration processing flag Freg is checked. When the flag Freg is at "1", the routine advances to a step S32.

In the step S32, the exhaust gas temperature limiting flag Flim is checked. When the flag Flim is at "0", the routine advances to a step S33, and when the flag Flim is at "1", the routine advances to a step S34.

In the step S33, the main injection amount is increased by a predetermined amount to raise the exhaust gas temperature.

In the step S34, the exhaust gas temperature is feedback-controlled such that the filter inlet temperature T1 reaches the upper regeneration temperature limit T1LMT. More specifically, when the filter inlet temperature T1 is lower than the upper regeneration temperature limit T1LMT, the main injection amount is increased to raise the exhaust gas temperature, and when the filter inlet temperature T1 is higher than the upper regeneration temperature limit T1LMT, the main injection amount is reduced to lower the exhaust gas temperature.

Here, the exhaust gas temperature is raised by increasing the main injection amount, and hence the filter inlet temperature T1 (exhaust gas temperature) is controlled to the upper regeneration temperature limit T1LMT by regulating the main injection amount. However, the exhaust gas temperature may be raised and controlled by another method.

For example, the exhaust gas temperature may be raised by performing a post-injection following the main injection between compression top dead center and sixty degrees after compression top dead center. When post-injection is performed, the exhaust gas temperature may be controlled by increasing or reducing the post-injection amount, modifying the post-injection timing, or both.

Alternatively, the exhaust gas temperature may be raised and controlled by executing an appropriate combination of main injection timing retardation, adjustment of the post-injection amount and timing, intake air throttling, and adjustment of the vane opening of a variable nozzle turbo. Such combinations are determined experientially in accordance with the operating condition.

According to this embodiment, the accumulated DPM amount in the DPM filter 4 is estimated, and the maximum filter temperature when the operating condition switches to an idling condition during regeneration processing is forecast. The upper regeneration temperature limit (the target temperature during regeneration processing) is then set in accordance with the accumulated DPM amount at the start of regeneration processing to ensure that the forecast maximum filter temperature does not exceed the upper filter temperature limit (see FIG. 4), whereupon the exhaust gas temperature is controlled to the set upper regeneration temperature limit (target temperature). In so doing, the filter temperature can be held below the critical filter temperature when the operating condition switches suddenly to an idling condition, or indeed to any other operating condition, during regeneration processing, thereby preventing damage to the durability of the filter 4.

In the embodiment described above, the upper regeneration temperature limit, which is the target exhaust gas temperature, is determined on the basis of the accumulated DPM amount at the start of filter regeneration processing, but the method of setting the target exhaust gas temperature is not limited thereto. Even when the accumulated DPM amount at the start of filter regeneration processing is the same, the maximum filter temperature differs when the operating condition suddenly switches to an idling condition while the DPM trapped in the filter is burning vigorously in the intermediate stage of the regeneration processing, and when the operating condition suddenly switches to an idling condition while only a small amount of DPM remains burning in the filter in the final stage of the regeneration processing. Hence the target exhaust gas temperature may be set in consideration of the remaining DPM amount after regeneration processing has begun as well as the accumulated DPM amount at the start of filter regeneration processing.

Figure 10:
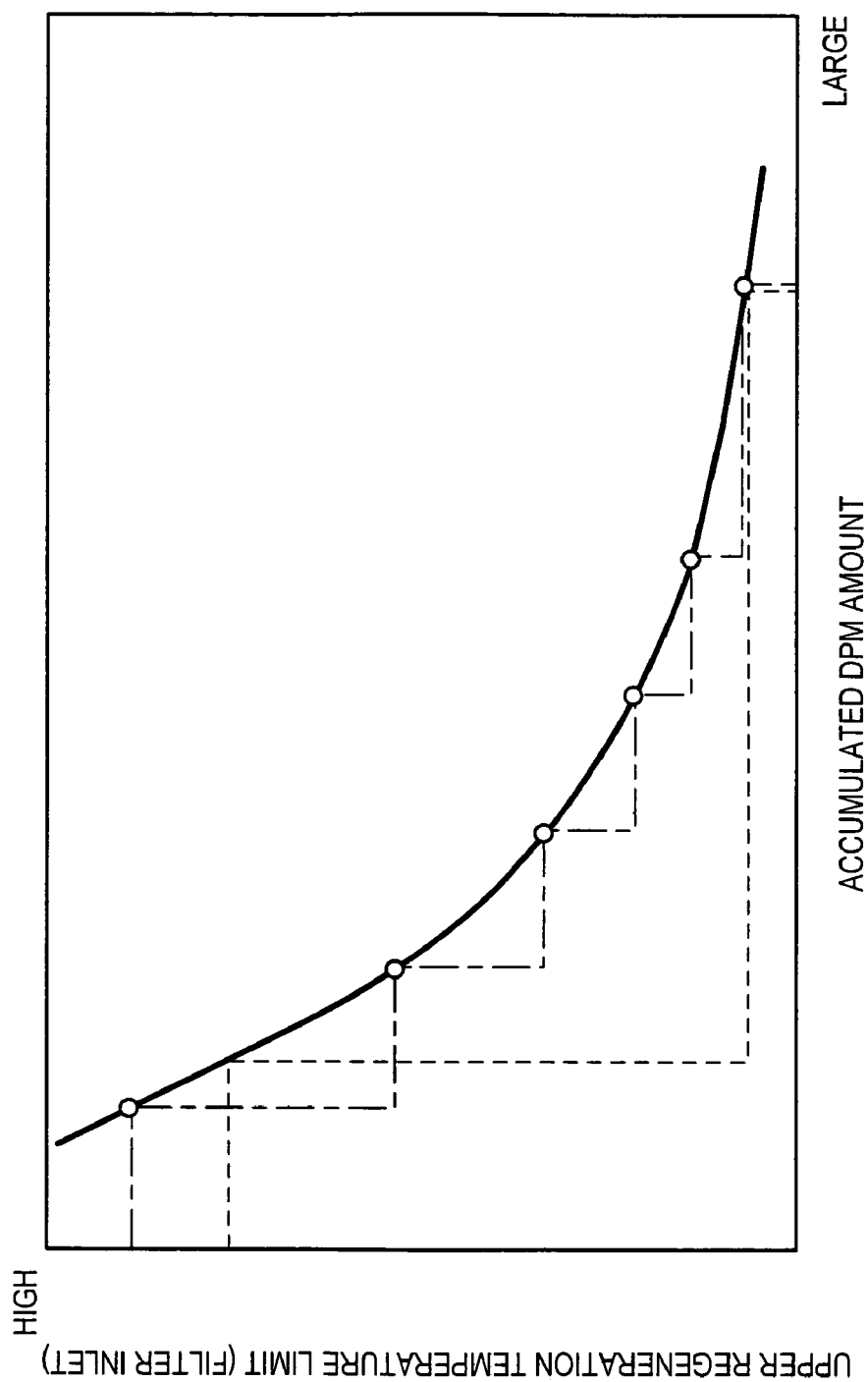
FIG. 10 is another example of a characteristic diagram of the upper regeneration temperature limit in relation to the accumulated DPM amount.

In the embodiment described above, the upper regeneration temperature limit (target exhaust gas temperature) is set as a continuous value, but the upper regeneration temperature limit (target exhaust gas temperature) may be set as discrete values, or in other words in multiple stages. For example, as shown in FIG. 10, the upper regeneration temperature limit may be set in two stages (broken line) or multiple stages (dot/dash line).

The entire contents of Japanese Patent Application P2003-326181 (filed Sep. 18, 2003) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. An engine system comprising:
   a diesel engine;
   an exhaust passage connected to the engine;
   a DPM filter provided on the exhaust passage, which traps diesel particulate matter (DPM) contained in an exhaust gas such that the DPM accumulates therein;
   a temperature adjusting device coupled to the engine, the temperature adjusting device adjusting an exhaust gas temperature of the engine and
   a controller coupled to the temperature adjusting device, the controller functioning to:
   start regeneration processing of the DPM filter by controlling the temperature adjusting device to raise an exhaust gas temperature when a regeneration timing of the DPM filter is reached;
   set a target exhaust gas temperature in an engine running condition other than an idling condition during regeneration processing to ensure that a temperature of the DPM filter does not exceed an upper temperature limit of the DPM filter, even when the temperature of the DPM filter is raised due to the engine entering the idling condition during the regeneration processing; and
   control the temperature adjusting device to control the exhaust gas temperature to the target exhaust gas temperature,
   wherein the controller further functions to:
   estimate an accumulated DPM amount in the DPM filter;
   forecast a maximum temperature of the DPM filter when the engine switches to an idling operation during the regeneration processing; and
   set the target exhaust gas temperature during regeneration processing in accordance with the estimated accumulated DPM amount such that the forecast maximum temperature of the DPM filter does not exceed the upper temperature limit of the filter.

2. The engine system as defined in claim 1, wherein the estimated accumulated DPM amount is a value at the start of regeneration processing.

3. The engine system as defined in claim 1, wherein the controller further functions to divide a range of the estimated accumulated DPM amount into a plurality of values, and set the target exhaust gas temperature during regeneration processing in multiple stages which decrease as the estimated accumulated DPM amount increases.

4. The engine system as defined in claim 1, wherein the controller further functions to set the target exhaust gas temperature during regeneration processing as a continuous value which decreases as the estimated accumulated DPM amount increases.

5. The engine system as defined in claim 1, wherein the controller further functions to:
   determine the exhaust gas temperature at an inlet to the DPM filter; and
   control the temperature adjusting device to feedback-control the exhaust gas temperature such that the exhaust gas temperature at the inlet to the DPM filter reaches the target exhaust gas temperature during regeneration processing.

* * * * *